Figure 1:
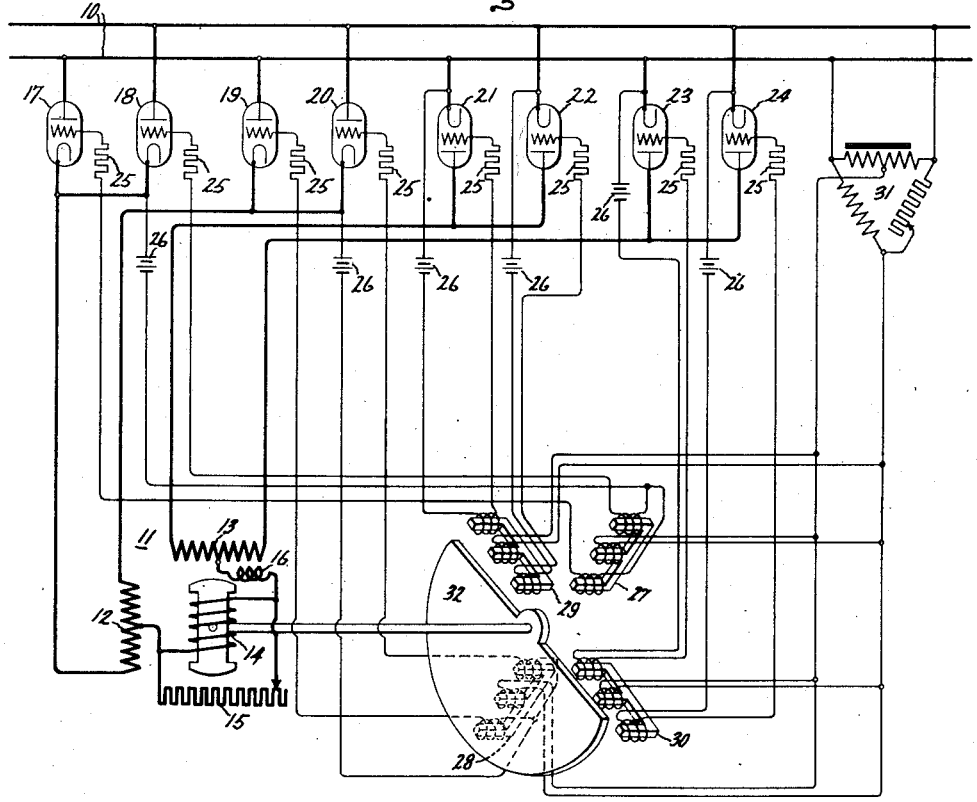

Dec. 12, 1933.  P. M. CURRIER  1,939,437
ELECTRIC VALVE CONVERTING SYSTEM AND EXCITATION APPARATUS THEREFOR
Filed June 22, 1933

Inventor:
Philip M. Currier,
by Harry E. Dunham
His Attorney.

Patented Dec. 12, 1933

1,939,437

UNITED STATES PATENT OFFICE 1,939,437

ELECTRIC VALVE CONVERTING SYSTEM AND EXCITATION APPARATUS THEREFOR

Philip M. Currier, Ballston Lake, N. Y., assignor to General Electric Company, a corporation of New York Application June 22, 1933. Serial No. 677,063

13 Claims. (Cl. 172—120)

My invention relates to electric valve converting systems and more particularly to new and improved apparatus for exciting the control elements of the electric valves of such converting systems.

Heretofore, there have been devised numerous electric valve converting systems for transmitting energy between direct and alternating current circuits, direct current circuits of different voltages, or independent alternating current circuits of the same or different frequencies. Many of these systems have included a distributor apparatus effective to render conductive the several electric valves in a predetermined sequence to transfer the current between the several terminals of the load circuit of the system. In many cases, however, it is desirable to eliminate the moving contacts and other disadvantages inherent in a mechanical distributing apparatus. My invention relates more particularly to an excitation apparatus which may replace the conventional mechanical distributor in the arrangements of the prior art.

It is an object of my invention, therefore, to provide an improved electric valve converting system and an excitation apparatus therefor which will overcome the disadvantages inherent in the mechanical distributor apparatus of the prior art and which will be simple and reliable in operation.

It is another object of my invention to provide an improved electric valve converting system and an excitation apparatus therefor which will render conductive the several electric valves in a predetermined sequence and which will eliminate all moving contacts.

In accordance with one embodiment of my invention, each of the terminals of a load circuit is interconnected with the several terminals of a supply circuit through a group of one or more electric valves. Each of the electric valves is provided with a control circuit in which is included an inductive winding. There is also provided an inductive member in asymmetric inductive relation to the inductive windings, as for example, by mounting the windings adjacent the path of rotation of the inductive member, which may be a segmental disk or some other mutilated form. The inductive member and the several windings are rotated relative to each other so that the reluctances of the magnetic paths of the windings are varied in a predetermined sequence. For example, the winding included in each control circuit may comprise the winding of a transformer having an open circuit magnetic core member the magnetic circuit of which is periodically closed by the rotation of a magnetic vane, or if desired, the inductive member may constitute a low resistance conductive member in which induced eddy currents are set up which affect the reluctance of the magnetic paths of the inductive windings in a well known manner. In accordance with another embodiment of my invention, the windings included in the control circuits of the electric valves may constitute impedance devices connected directly between a source of control potential and the control elements of the electric valves. The reluctance, and thus the impedance of these devices may be varied as described above.

Figure 2:
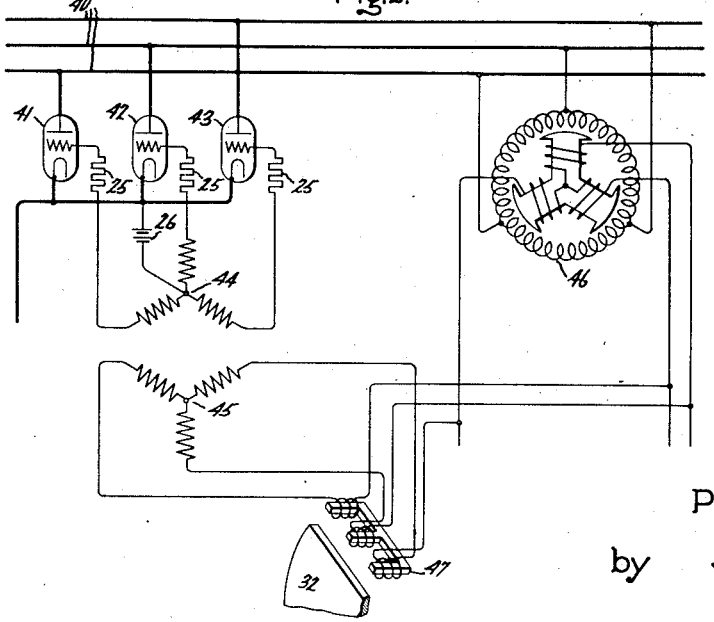

For a better understanding of my invention, together with other and further objects thereof, reference is had to the following description taken in connection with the accompanying drawing and its scope will be pointed out in the appended claims. Fig. 1 of the drawing illustrates diagrammatically an electric valve converting system for transmitting energy from a single phase alternating current circuit to a quarter phase alternating current motor to which is applied my improved valve excitation apparatus, while Fig. 2 shows a modified form of the excitation apparatus.

Referring now more particularly to Fig. 1 of the drawing, there is illustrated an arrangement for transmitting energy from a single phase alternating current supply circuit 10 to a quarter phase alternating current motor 11 of the synchronous type comprising armature phase windings 12 and 13 and a rotatable field winding 14. The field winding 14 may be connected in series with the armature winding, as illustrated, in case it is desired to give the motor series characteristics, or in case shunt characteristics are desired the field winding 14 may be separately excited in any well known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed torque characteristics of the motor, in which case it is preferable also to include a reactor 16 in series with the parallel connected winding 14 and resistor 15.

The terminals of the armature phase winding 12 are connected to the supply circuit 10 through two pairs of similarly connected electric valves 17 and 18, and 19 and 20, respectively. Similarly the armature phase winding 13 is connected to the supply circuit 10 through two pairs of electric valves 21 and 22, and 23 and 24, connected to the circuit 10 with a polarity opposite to that of the electric valves 17–20, inc. Each of the electric valves 17–24, inc., is provided with an anode, a cathode and a control electrode or grid and may be of any of the several types well known in the art, although I prefer to use valves of the vapor or gaseous electric discharge type.

In order to render conductive the several electric valves in a predetermined sequence, the control electrodes, or grids, of the pairs of valves 17—18, 19—20, etc., are connected to their respective cathodes through current limiting resistors 25, negative bias batteries 26 and secondary windings of grid transformers 27, 28, 29 and 30, respectively, although in some instances, the negative bias batteries 26 may be satisfactorily omitted. The primary windings of the grid transformers 27–30, inc., are excited from the alternating current supply circuit 10 through any suitable phase adjusting means such as an impedance phase shifting circuit 31 of a type well known in the art. As indicated in the drawing, each of the transformers 27–30, inc., is provided with an open circuit magnetic core. There is also provided an inductive member or vane 32 connected to be driven by the motor 11. This vane may take the form of a segment of a disk or a segment of a cylinder, or some other mutilated symmetrical form. The magnetic circuits of the transformers 27–30, inc., are symmetrically mounted adjacent the path of rotation of the inductive member 32. However, this feature of controlling the conductivity of a group of electric valves by a distributor mechanism driven by a motor energized through the valves forms no part of my present invention, but is disclosed and broadly claimed in a copending application of E. F. W. Alexanderson, Serial No. 638,361, filed May 11, 1923, and assigned to the same assignee as the present application.

The general principles of operation of the above described apparatus for transmitting energy from the alternating current circuit 10 to the motor 11 will be well understood by those skilled in the art, or may be found explained in detail in the copending application of E. F. W. Alexanderson, Serial No. 598,380, filed March 12, 1932, and assigned to the same assignee as the present application. That application discloses and broadly claims the above described power circuit which forms no part of my present invention. Assuming that the motor field winding 14 and the inductive member 32 are substantially in the positions illustrated and that the phase shifting circuit 31 is so adjusted that the potentials impressed upon the primary windings of the several transformers 27–30, inc., are substantially in phase with the potential of the alternating current circuit 10, and assuming that the inductive member 32 is of magnetic material, it will be seen that the magnetic circuits of the transformers 28 and 30 will be closed by the vane 32. Under these conditions, alternating potentials of normal magnitude will be induced in the secondary windings of these grid transformers to excite the grids of the pairs of valves 19 and 20, and 23 and 24, associated therewith. At the same time the magnetic circuits of the grid transformers 27 and 29 are open so that the potentials induced in the secondary windings of these transformers are very small in magnitude and insufficient to overcome the negative bias of the battery 26 to render conductive the pairs of electric valves 17 and 18, and 21 and 22, which they control. The two pairs of electric valves 19 and 20, and 23 and 24 comprise a full wave rectifying circuit of which the unidirectional load circuit comprises the upper portion of the armature phase winding 12, the field winding 14, reactor 16, and the right-hand portion of the armature phase winding 13. The resultant armature magnetomotive force created by current flowing in the armature windings 12 and 13 will be in such a direction as to cause a torque upon the motor field 14 and initiate rotation of the motor, which, it will be assumed, is in a counterclockwise direction.

When the motor 11 has rotated through approximately 90 electrical degrees, the inductive vane 32 will have moved to open the magnetic circuit of the grid transformer 28 and close the magnetic circuit of the grid transformer 27 so that the potentials impressed upon the grids of the valves 19 and 20 will be insufficient to overcome the negative bias of the battery 26 and these valves will be maintained non-conductive, while electric valves 17 and 18 will be rendered conductive. The result is that current is transferred from the upper portion to the lower portion of the armature winding 12 and the armature magnetomotive force of the motor 11 is thus advanced 90 electrical degrees and a torque is produced on the motor field 14 to rotate it through an additional 90 degrees. In this manner current is successively commutated between the several terminals of the armature windings 12 and 13 to produce a rotating magnetomotive force and a rotation of the motor 11. The inductive member 32 is effective to close the magnetic circuits of only those grid transformers associated with the valves connected to the terminals of the armature windings which are in a torque producing position with respect to the motor field 14 at any particular instant. The speed of the motor may be controlled by adjusting the phase shifting circuit 31 or the field shunting resistor 15, or both, as is well understood by those skilled in the art.

Thus it is seen that the several pairs or groups of electric valves are rendered conductive in a predetermined sequence to transfer the current between the several terminals of the load circuit without the aid of any moving contacts or any moving parts, other than the simple, rugged vane 32 attached directly to the motor shaft.

In the foregoing explanation, it has been assumed that the inductive vane 32 is a magnetic vane in inductive relation to the magnetic circuits of the several grid transformers 27–30, inc. However, if desired, a similar type of operation may be secured by constructing the inductive member 32 of conductive material, such as copper or aluminum. In this case, the several grid transformers 27–30, inc., should be so designed that, when the inductive member 32 is not in inductive relation to a particular transformer, the voltages induced in the secondary windings of the transformer are of sufficient magnitude to overcome the negative bias in the grid circuits of the several electric valves so that they are effective to control their conductivity. When the conductive element rotates into position adjacent the particular grid transformer, eddy currents are induced in the vane and it acts in a manner similar to a short circuited secondary winding, thus substantially reducing the voltage of the secondary windings of the grid transformer in a well known manner. Thus, the inductive member may comprise either a conductive or a magnetic member which is in asymmetric inductive relation to the magnetic circuits of the several grid transformers and which operates, upon rotation, to vary the effective reluctances of their magnetic paths.

In Fig. 2 is shown a detail of a modified form of my invention in which the inductive windings having magnetic paths whose reluctances are varied by a rotating inductive member, comprise series impedances in the control circuits of the several electric valves, rather than grid transformers. In this figure is shown only the control of a single group of electric valves 41, 42 and 43, connected to transmit energy from a three phase alternating current supply circuit 40, although it will be understood that the control of the other groups of valves is similar, as in the arrangement of Fig. 1. In this arrangement the grids of the several electric valves 41, 42, and 43 are connected to their common cathode circuit through current limiting resistors 25, the negative bias battery 26 and the proper phase windings of the secondary network 44 of a grid transformer. The grid transformer is provided with a primary three phase network 45 which is connected to be excited from the alternating current supply circuit 40 through any suitable phase shifting arrangement, such as a rotary phase shifting transformer 46. There is also provided a three phase reactance device 47 comprising a three legged magnetic core member, on each of the legs of which is mounted an inductive winding in series with one of the phases of the primary network 45 of the grid transformer. The inductive member 32 is mounted to periodically close the magnetic circuit of the reactance device 47, as in the arrangement of Fig. 1. With such an arrangement, the exciting impedance of the polyphase reactance device 47 is so high that, when its magnetic circuit is closed, only a reduced voltage is applied to the primary network 45 of the grid transformer so that the associated valves 41, 42 and 43 are maintained nonconductive by the negative bias battery 26 in their control circuits. When the vane 32, however, moves away from the reactance device 47, open circuiting the magnetic path, the impedance drops to a relatively low value allowing substantially full voltage to be applied to the primary network 45 to control the conductivity of the valves 41, 42, and 43. As in the arrangement of Fig. 1, the inductive member 32 may be either of magnetic material or low resistance conducting material.

While I have illustrated my invention as applied to a system for transmitting energy from a single phase or three phase alternating current supply circuit to a quarter phase alternating current motor, it will be well understood that it is equally applicable to the transmission of energy from a supply circuit of any number of phases to a load circuit or motor of any number of phases.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a controlled electric valve converting system, apparatus for exciting the control elements of the valves of the system in a predetermined sequence comprising a control circuit for each of said valves, an inductive winding included in each of said control circuits, and means for producing successive variations in the reluctance of the magnetic paths of said windings comprising an inductive vane in asymmetric inductive relation to said inductive windings and means for producing relative rotation between said vane and said windings.

2. In a controlled electric valve converting system, apparatus for exciting the control elements of the valves of the system in a predetermined sequence comprising a control circuit for each of said valves, an inductive winding included in each of said control circuits and provided with an open magnetic circuit, a magnetic vane in asymmetric relation to the magnetic circuits of said inductive windings, and means for producing relative rotation between said vane and said windings to successively close their magnetic circuits.

3. In a controlled electric valve converting system, apparatus for exciting the control elements of the valves of the system in a predetermined sequence comprising a control circuit for each of said valves, a rotatable segmental inductive vane, an inductive winding included in each of said control circuits, said inductive windings being symmetrically spaced adjacent the path of rotation of said vane and in inductive relation thereto, and means for rotating said vane to produce successive variations in the reluctance of the magnetic paths of said windings.

4. In a controlled electric valve converting system, apparatus for exciting the control elements of the valves of the system in a predetermined sequence comprising a control circuit for each of said valves, a source of control potential, a plurality of open core transformers each provided with a primary winding connected to said source and a secondary winding included in one of said control circuits, an inductive member in asymmetric inductive relation to said transformer cores, and means for producing relative rotation between said inductive member and said cores.

5. In a controlled electric valve converting system, apparatus for exciting the control elements of the valves of the system in a predetermined sequence comprising a control circuit for each of said valves, a source of control potential, a plurality of transformers, each provided with an open magnetic core, a primary winding connected to said source and a secondary winding included in one of said control circuits, a magnetic member in asymmetric inductive relation to said transformer cores, and means for rotating said magnetic member to close successively the magnetic circuits of said transformers.

6. In a controlled electric valve converting system, apparatus for exciting the control elements of the valves of the system in a predetermined sequence comprising a control circuit for each of said valves, a source of control potential included in each of said control circuits, an impedance device in series with each of said control circuits, and means for producing successive variations in the impedances of said devices.

7. In a controlled electric valve converting system, apparatus for exciting the control elements of the valves of the system in a predetermined sequence comprising a control circuit for each of said valves, a source of control potential included in each of said control circuits, an inductive winding included in each of said control circuits, means for producing successive variations in the reluctance of the magnetic paths of said windings comprising a member in asymmetric inductive relation to said inductive windings, and means for producing relative rotation between said member and said windings.

8. In a controlled electric valve converting system, apparatus for exciting the control elements of the valves of the system in a predetermined sequence comprising a control circuit for each of said valves, a source of control potential included in each of said control circuits, an impedance device provided with an open magnetic core connected in each of said control circuits, a member in asymmetric inductive relation to said magnetic cores, and means for producing relative rotation between said member and said cores.

9. Apparatus for generating an intermittent periodic potential comprising an open circuit magnetic core member provided with a primary winding for connection to a source of periodic current and with a secondary winding, a rotatable magnetic member mounted adjacent said core member and so formed as to variably close the magnetic circuit of said core member in different positions, and means for rotating said magnetic member.

10. Apparatus for generating an intermittent alternating potential comprising an open circuit magnetic core member provided with a primary winding for connection to a source of alternating current and with a secondary winding, a mutilated rotatable magnetic member in asymmetric inductive relation to said core member, and means for continuously rotating said magnetic core member to intermittently close the magnetic circuit of said core member.

11. Apparatus for generating an intermittent alternating potential comprising an open circuit magnetic core provided with a plurality of magnetic branches, a primary winding for connection to a source of alternating current and with a secondary winding, said windings being mounted on separate branches of said core, a rotatable segmental magnetic vane mounted in inductive relation to said core, and means for rotating said vane to intermittently close the magnetic circuit of said core.

12. In a controlled electric valve converting system for transmitting energy from a supply circuit to a load circuit including an alternating current motor, said system including a plurality of valves interconnecting said supply circuit with the several terminals of said load circuit, apparatus for exciting the control elements of the valves to render said valves conductive in a predetermined sequence comprising a control circuit for each of said valves, an inductive winding included in each of said control circuits, and means for producing successive variations in the reluctance of the magnetic paths of said windings comprising a rotatable inductive vane in asymmetric inductive relation to said inductive windings and connected to be driven by said motor.

13. In combination, a supply circuit, a load circuit provided with a plurality of terminals, a plurality of electric valves interconnecting said supply circuit and the several terminals of said load circuit, each of said valves being provided with a control element, a control circuit for each of said control elements, an inductive winding included in each of said control circuits, an inductive vane in asymmetric inductive relation to said inductive windings, and means for producing relative rotation between said vane and said windings to render said valves conductive in a predetermined sequence.

PHILIP M. CURRIER.